(12) United States Patent
Lui et al.

(10) Patent No.: US 10,785,117 B2
(45) Date of Patent: Sep. 22, 2020

(54) METHODS AND APPARATUS FOR CONFIGURING A STANDBY WAN LINK IN AN ADAPTIVE PRIVATE NETWORK

(71) Applicant: Talari Networks Incorporated, San Jose, CA (US)

(72) Inventors: Wai Yee Lui, Chapel Hill, NC (US); Wei Huang, Cary, NC (US)

(73) Assignee: TALARI NETWORKS INCORPORATED, San Jose, CA (US)

( * ) Notice: Subject to any disclaimer, the term of this patent is extended or adjusted under 35 U.S.C. 154(b) by 0 days.

(21) Appl. No.: 15/409,001

(22) Filed: Jan. 18, 2017

(65) Prior Publication Data

US 2017/0207996 A1    Jul. 20, 2017

Related U.S. Application Data

(60) Provisional application No. 62/372,021, filed on Aug. 8, 2016, provisional application No. 62/371,998, filed
(Continued)

(51) Int. Cl.
*H04L 12/24* (2006.01)
*H04L 12/26* (2006.01)
(Continued)

(52) U.S. Cl.
CPC ........ *H04L 41/0896* (2013.01); *H04L 41/083* (2013.01); *H04L 41/0813* (2013.01);
(Continued)

(58) Field of Classification Search
CPC . H04L 41/0896; H04L 41/0813; H04L 41/12; H04L 41/083; H04L 43/16;
(Continued)

(56) References Cited

U.S. PATENT DOCUMENTS 6,721,290 B1    4/2004   Kondylis et al.
7,139,268 B1   11/2006   Bhagwat et al.
(Continued)

OTHER PUBLICATIONS

Advisory Action for U.S. Appl. No. 14/481,335 (dated Nov. 8, 2019).
(Continued)

*Primary Examiner* — Jianye Wu
(74) *Attorney, Agent, or Firm* — Jenkins, Wilson, Taylor & Hunt, P.A.

(57) ABSTRACT

Techniques for providing a backup network path using a standby wide area network (WAN) link with reducing monitoring. Packet loss and latency metrics are monitored for network paths in an adaptive private network (APN) connecting a first user and a second user according to control traffic operating at a first control bandwidth for each network path. A determination is made that a first network path uses a standby WAN link, has packet loss and latency metrics indicative of a good quality state, and has at least one characteristic that identifies the first network path as a backup network path. The control traffic is then reduced for the backup network path to a second control bandwidth substantially less than the first control bandwidth. The backup network path is made active when the number of active network paths is less than or equal to a minimum number.

6 Claims, 9 Drawing Sheets

Related U.S. Application Data on Aug. 8, 2016, provisional application No. 62/280,448, filed on Jan. 19, 2016, provisional application No. 62/280,356, filed on Jan. 19, 2016, provisional application No. 62/280,381, filed on Jan. 19, 2016.

(51) Int. Cl.

| | | |
|---|---|---|
| *H04L 12/707* | (2013.01) | |
| *H04L 12/751* | (2013.01) | |
| *H04L 12/753* | (2013.01) | |
| *H04L 12/741* | (2013.01) | |
| *H04L 12/803* | (2013.01) | |
| *H04M 1/725* | (2006.01) | |
| *H04L 12/743* | (2013.01) | |
| *H04L 29/12* | (2006.01) | |
| *H04L 12/935* | (2013.01) | |

(52) U.S. Cl.
CPC ............ *H04L 41/12* (2013.01); *H04L 43/08* (2013.01); *H04L 45/02* (2013.01); *H04L 45/22* (2013.01); *H04L 45/48* (2013.01); *H04L 45/54* (2013.01); *H04L 45/7453* (2013.01); *H04L 47/125* (2013.01); *H04L 49/3063* (2013.01); *H04L 61/6022* (2013.01); *H04M 1/72519* (2013.01); *H04L 43/0829* (2013.01); *H04L 43/0876* (2013.01); *H04L 43/0888* (2013.01); *H04L 43/0894* (2013.01); *H04L 43/10* (2013.01); *H04L 43/16* (2013.01); *H04L 43/50* (2013.01)

(58) Field of Classification Search
CPC . H04L 43/0894; H04L 43/50; H04L 43/0888; H04L 43/10; H04L 43/08; H04L 61/6022; H04L 45/02; H04L 45/48; H04L 45/54; H04L 45/7453; H04L 45/22; H04L 47/125; H04L 49/3063; H04L 43/0876; H04L 43/0829; H04M 1/72519
See application file for complete search history.

(56) References Cited

U.S. PATENT DOCUMENTS

| | | |
|---|---|---|
| 7,426,181 B1 | 9/2008 | Feroz et al. |
| 7,433,943 B1 | 10/2008 | Ford |
| 7,664,048 B1 | 2/2010 | Yung et al. |
| 7,801,030 B1 | 9/2010 | Aggarwal et al. |
| 8,125,907 B2 | 2/2012 | Averi et al. |
| 8,274,891 B2 | 9/2012 | Averi et al. |
| 8,452,846 B2 | 5/2013 | Fredette et al. |
| 8,644,164 B2 | 2/2014 | Averi et al. |
| 8,775,547 B2 | 7/2014 | Fredette et al. |
| 9,069,727 B2 | 6/2015 | Martin et al. |
| 9,100,338 B2 | 8/2015 | Averi et al. |
| 9,392,061 B2 | 7/2016 | Fredette et al. |
| 10,341,237 B2 | 7/2019 | Averi et al. |
| 10,447,543 B2 | 10/2019 | Rovner et al. |
| 2002/0027885 A1 | 3/2002 | Ben-Ami |
| 2004/0064469 A1* | 4/2004 | Takahashi ............... H04L 29/06 |
| 2005/0102390 A1 | 5/2005 | Peterson et al. |
| 2006/0239271 A1 | 10/2006 | Khasnabish et al. |
| 2007/0248077 A1 | 10/2007 | Mahle, Jr. et al. |
| 2007/0286090 A1 | 12/2007 | Rusmisel et al. |
| 2007/0297332 A1 | 12/2007 | Broberg et al. |
| 2008/0069133 A1 | 3/2008 | Yong et al. |
| 2009/0147806 A1 | 6/2009 | Brueckheimer |
| 2011/0007631 A1 | 1/2011 | Raina et al. |
| 2012/0314578 A1 | 12/2012 | Averi et al. |
| 2013/0077701 A1 | 3/2013 | Tsien et al. |
| 2013/0339101 A1 | 12/2013 | Riley et al. |
| 2014/0173331 A1* | 6/2014 | Martin ................ G06F 11/2002 |
| | | 714/4.11 |
| 2015/0071067 A1 | 3/2015 | Martin et al. |
| 2016/0006658 A1 | 1/2016 | Averi et al. |
| 2016/0072706 A1 | 3/2016 | Huang et al. |
| 2016/0179850 A1 | 6/2016 | Martin et al. |
| 2016/0182305 A1 | 6/2016 | Martin et al. |
| 2016/0182319 A1 | 6/2016 | Martin et al. |
| 2016/0182327 A1* | 6/2016 | Coleman, Jr. ........... H04L 41/12 |
| | | 370/329 |
| 2016/0197802 A1 | 7/2016 | Schultz et al. |
| 2016/0345341 A1 | 11/2016 | Oliver et al. |
| 2017/0026280 A1 | 1/2017 | Yu et al. |
| 2017/0055133 A1 | 2/2017 | Dieselberg et al. |
| 2017/0207976 A1 | 7/2017 | Rovner et al. |
| 2019/0349259 A1 | 11/2019 | Rovner et al. |

OTHER PUBLICATIONS

Final Office Action for U.S. Appl. No. 14/481,335 (dated Aug. 8, 2019).
Non-Final Office Action for U.S. Appl. No. 14/481,335 (dated Jan. 24, 2020).
Notice of Allowance and Fee(s) Due for U.S. Appl. No. 15/647,924 (dated Feb. 19, 2019).
Non-Final Office Action for U.S. Appl. No. 15/409,019 (dated Dec. 6, 2018).
Notice of Allowance and Fee(s) Due for U.S. Appl. No. 13/592,460 (dated Oct. 2, 2013).
Non-Final Office Action for U.S. Appl. No. 13/592,460 (dated May 24, 2013).
Applicant-Initiated Interview Summary for U.S. Appl. No. 14/481,335 (dated Oct. 23, 2019).
Non-Final Office Action for U.S. Appl. No. 14/481,335 (dated Apr. 1, 2019).
Applicant-Initiated Interview Summary for U.S. Appl. No. 14/481,335 (dated Mar. 22, 2019).
Applicant-Initiated Interview Summary for U.S. Appl. No. 15/409,019 (dated Mar. 15, 2019).
Notice of Allowance and Fee(s) Due and Examiner-Initiated Interview Summary for U.S. Appl. No. 15/409,019 (dated Jun. 4, 2019).

\* cited by examiner

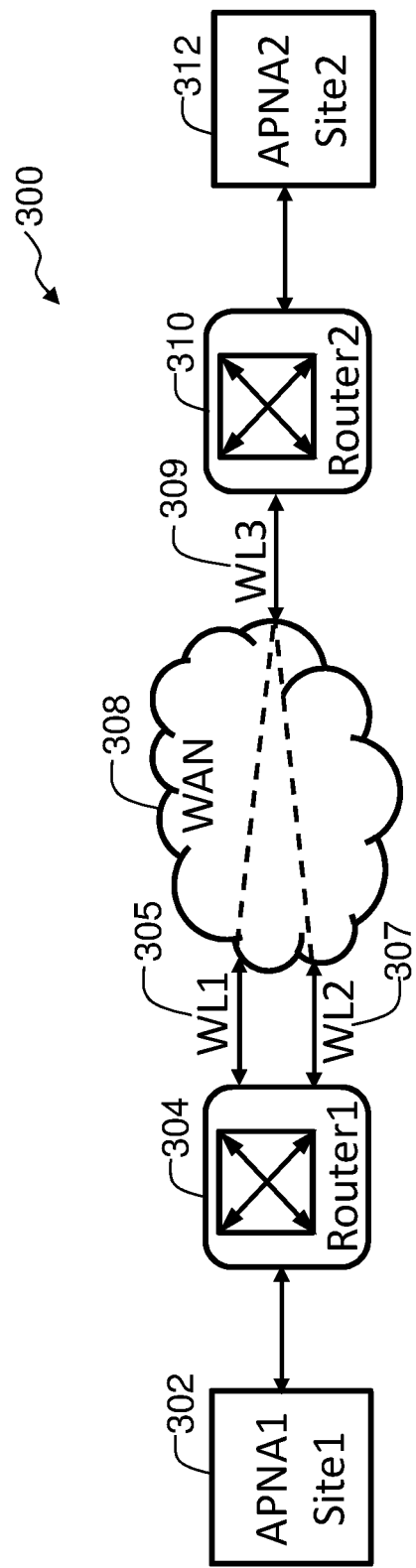
Fig. 3A1

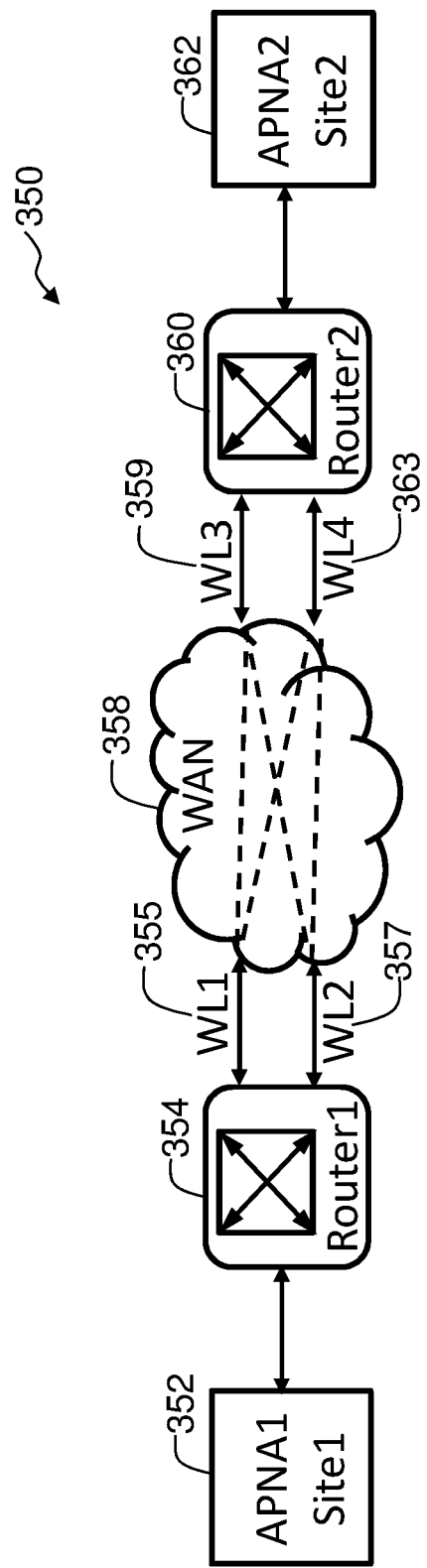
Fig. 3A2

METHODS AND APPARATUS FOR CONFIGURING A STANDBY WAN LINK IN AN ADAPTIVE PRIVATE NETWORK

The present application claims the benefit of U.S. Provisional Patent Application Ser. No. 62/280,356 titled "Methods and Apparatus for Configuring a Standby WAN link in an Adaptive Private Network" filed Jan. 19, 2016; U.S. Provisional Patent Application Ser. No. 62/280,448 titled "Methods and Apparatus for Accessing Selectable Application Processing of Data Packets in an Adaptive Private Network" filed Jan. 19, 2016; U.S. Provisional Patent Application Ser. No. 62/280,381 titled "Methods and Apparatus for Accessing Dynamic Routing Information from Networks Coupled to a Wide Area Network (WAN) to Determine Optimized End-to-End Routing Paths" filed on Jan. 19, 2016; U.S. Provisional Patent Application Ser. No. 62/371,998 titled "Applications and Integrated Firewall Design in an Adaptive Private Network (APN)" filed Aug. 8, 2016; and U.S. Provisional Patent Application Ser. No. 62/372,021 titled "Adaptive Private Network (APN) Bandwidth Enhancements" filed Aug. 8, 2016 which are incorporated by reference herein in their entirety.

CROSS REFERENCE TO RELATED APPLICATIONS

The present application is also related to U.S. patent application Ser. No. 14/146,786 filed on Jan. 3, 2014 which issued as U.S. Pat. No. 9,100,338 entitled "Flow-Based Adaptive Private Network With Multiple Wan-Paths", which is a divisional of U.S. patent application Ser. No. 13/592,460 filed on Aug. 23, 2012 which issued as U.S. Pat. No. 8,644,164 entitled "Flow-Based Adaptive Private Network With Multiple WAN-Paths", which is a continuation of U.S. patent application Ser. No. 13/353,693 filed on Jan. 19, 2012 which issued as U.S. Pat. No. 8,274,891 entitled "Flow-Based Adaptive Private Network With Multiple WAN-Paths", which is a continuation of U.S. patent application Ser. No. 12/482,766 filed on Jun. 11, 2009 which issued as U.S. Pat. No. 8,125,907 entitled "Flow-Based Adaptive Private Network with Multiple WAN-Paths", all of which claim the benefit of U.S. Provisional Patent Application No. 61/060,846 entitled "Flow-based Adaptive Private Network with Multiple WAN-Paths" filed Jun. 12, 2008; U.S. patent application Ser. No. 14/291,776 filed on May 30, 2014 which issued as U.S. Pat. No. 9,392,061 entitled "Adaptive Private Network Asynchronous Distributed Shared Memory Services", which is a continuation of U.S. patent application Ser. No. 13/850,411 filed on Mar. 26, 2013 which issued as U.S. Pat. No. 8,775,547 entitled "Adaptive Private Network Asynchronous Distributed Shared Memory Services", and which is a continuation of U.S. patent application Ser. No. 13/208,825 filed on Aug. 12, 2011 which issued as U.S. Pat. No. 8,452,846 entitled "Adaptive Private Network Asynchronous Distributed Shared Memory Services", all of which claim the benefit of U.S. Provisional Patent Application Ser. No. 61/372,904 entitled "Adaptive Private Network Asynchronous Distributed Shared Memory Services" filed Aug. 12, 2010; U.S. patent application Ser. No. 13/719,433 filed on Dec. 19, 2012 which issued as U.S. Pat. No. 9,069,727 entitled "An Adaptive Private Network with Geographically Redundant Network Control Nodes"; U.S. patent application Ser. No. 14/019,723 filed on Sep. 6, 2013 and published as U.S. Patent Application No. 2015-0071067 A1 entitled "An Adaptive Private Network with Path Maximum Transmission Unit (MTU) Discovery Process"; U.S. patent application Ser. No. 14/481,335 filed on Sep. 9, 2014 and published as U.S. Patent Application No. 2016-0072706 A1 entitled "Adaptive Private Network with Dynamic Conduit Process"; U.S. patent application Ser. No. 14/972,270 filed on Dec. 17, 2015 and published as U.S. Patent Application No. 2016-0182305 A1 entitled "Methods and Apparatus for Providing Adaptive Private Network Centralized Management System Discovery Processes"; U.S. patent application Ser. No. 14/972,353 filed on Dec. 17, 2015 and published as U.S. Patent Application No. 2016-0182319 A1 entitled "Methods and Apparatus for Providing Adaptive Private Network Centralized Management System Timestamp Correlation Processes"; U.S. patent application Ser. No. 14/972,514 filed on Dec. 17, 2015 and published as U.S. Patent Application No. 2016-0179850 A1 entitled "Methods and Apparatus for Providing Adaptive Private Network Database Schema Migration and Management Processes"; U.S. patent application Ser. No. 14/973,193 filed on Dec. 17, 2015 and published as U.S. Patent Application No. 2016-0182327 A1 entitled "Methods and Apparatus for Providing Adaptive Private Network Centralized Management System Data Visualization Processes"; U.S. patent application Ser. No. 14/973,343 filed on Dec. 17, 2015 and published as U.S. Patent Application No. 2016-0197802 A1 entitled "Methods and Apparatus for Providing Adaptive Private Network Centralized Management System Time Correlated Playback of Network Traffic";

U.S. patent application Ser. No. 15/409,006 filed on Jan. 18, 2017 entitled "Methods And Apparatus For Accessing Selectable Application Processing Of Data Packets In An Adaptive Private Network"; U.S. patent application Ser. No. 15/409,016 filed on Jan. 18, 2017 entitled "Methods And Apparatus For Accessing Dynamic Routing Information From Networks Coupled To A Wide Area Network (Wan) To Determine Optimized End-To-End Routing Paths"; and U.S. patent application Ser. No. 16/523,997 filed on Jan. 18, 2017 entitled "Adaptive Private Network (APN) Bandwidth Enhancements", all of which have the same assignee as the present application, are related applications, and are hereby incorporated by reference in their entirety.

FIELD OF THE INVENTION

The present invention relates generally to improved management of networks having wide area network (WAN) links. More specifically, the present invention relates to improved techniques for configuring and operating a standby WAN link in the context of an adaptive private network (APN).

BACKGROUND OF THE INVENTION

Wide area network (WAN) standards include, for example, digital subscriber line (DSL), asymmetric digital subscriber line (ADSL), and multiprotocol label switching (MPLS), to mention a few. WANs are used to connect local area networks (LANs) allowing devices in one location to communicate with devices and their users in other locations. In a WAN having a large number of remote sites, connections between the sites are many times statically configured. The dynamics of the network system may also change over time making repeated static configurations of the network inefficient and costly to implement. Further, static connections involve reservations of network resources. As data flow patterns change in the network, the reserved resources create non-optimal static connections which cause the network to reserve bandwidth that could be better used elsewhere in the network.

For example, a site A is anticipated to have high bandwidth requirements for data transfer with site B and site C is anticipated to also have high bandwidth requirements for data transfer with site B. Since at the time the network is configured there may be little anticipated requirement for communication between site A and site C and since sites A and C can communicate to each other by going through site B, a communication path between sites A and C is not statically configured. With the network system operating over time, the original assumptions on communication paths will likely change. For example, sites A and C may require communication at a much higher bandwidth at this later time than is easily achieved by communicating through the intermediate site B thereby causing congestion on the paths between sites A and B and between sites B and C. A reconfiguration of the network is not usually feasible due to configuration overhead and lost time in operating the network. Also, different types of data packets require different types of compression applications to more optimally reduce packet size and improve network use of available bandwidth. Further, the dynamics of the network system may further change over time making repeated static configuration of the network inefficient and costly to implement. Further, static connections involve reservations of network resources. As data flow patterns change in the network, the reserved resources create non-optimal static connections which cause the network to reserve bandwidth that could be better used elsewhere in the network.

As networks become larger and more complex, administrative techniques for managing the network are increasingly more complex and costly. An increasing number of network configurations are configuring high cost links, such as 3G/4G cellular links, in their network as backup links. These high cost backup links either incur significant charges when used or when a monthly data cap is exceeded so the intent is to carry user traffic only when all other links are down. In other words, these backup links are links of last resort and very costly to use.

SUMMARY OF THE INVENTION

Among its several aspects, the present invention recognizes what is needed is a backup link that not only continues to maintain APN quality monitoring functions, but also is more cost effective than an active WAN link that does not carry user traffic. This backup preferably provides adequate bandwidth in complex high performance networks to carry user traffic generally when all other WAN links are down and keeps bandwidth usage on these standby backup links as low as possible when they are standing by. Among its several aspects, the present invention addresses systems and techniques which configure a WAN link as a backup WAN link. An embodiment of the invention applies a method to monitor a standby WAN link for connectivity for paths between two or more locations. Another embodiment of the invention applies a method to monitor the health, for example, latency, jitter or the like, of a standby WAN link for paths between two or more locations. Another embodiment of the invention applies a method to monitor multiple standby WAN links allowing only one to be active between any two endpoints based on the connectivity and health of standby WAN link paths.

Another embodiment applies a method for providing a backup network path using a standby WAN link with reduced monitoring. Packet loss and latency metrics are monitored for a plurality of network paths connecting a first user and a second user according to control traffic operating at a first control bandwidth for each network path of the plurality of network paths. A determination is made that a first network path selected from the plurality of network paths uses a user configured standby WAN link, has packet loss and latency metrics indicative of a good quality state, and has at least one characteristic that identifies the first network path as a candidate backup network path, wherein the first network path is marked as a backup network path and user data traffic is balanced among remaining network paths connecting the first user and the second user. Said control traffic is reduced for the backup network path to a second control bandwidth substantially less than the first control bandwidth that is used for each of the remaining network paths. The backup network path is selected as an active operating network path in response to determining the number of remaining network paths that are active has been reduced to less than or equal to a user configured minimum number.

Another embodiment applies a method to activate a standby WAN link selected from a plurality of standby WAN links based on quality metrics of each of the standby WAN links. An adaptive private network (APN) is configured with a plurality of network paths including a plurality of regular WAN links and a plurality of standby WAN links connecting a first user and a second user. Network paths utilizing regular WAN links are assigned to a first group as regular network paths and network paths utilizing one standby WAN link to a second group as backup network paths. In a first monitoring operation, bandwidth and packet loss and latency metrics are determined for the plurality of network paths including the plurality of standby WAN links according to control traffic. In a second monitoring operation, a determination is made that a number of network paths in the first group that can carry user traffic has been reduced to less than or equal to a user configured minimum number and there are at least two or more network paths in the second group that can carry user traffic. Another determination is made that there is at least one or more good quality state network paths in the second group that can carry user traffic. A network path with the highest bandwidth among the one or more good quality state network paths is marked active, wherein one standby WAN link is selected from a plurality of standby WAN links.

A further embodiment addresses a computer readable non-transitory medium storing a computer program which causes a computer system to perform a method for providing a backup network path using a standby WAN link with reduced monitoring. Packet loss and latency metrics are monitored for a plurality of network paths connecting a first user and a second user according to control traffic operating at a first control bandwidth for each network path of the plurality of network paths. A determination is made that a first network path selected from the plurality of network paths uses a user configured standby WAN link, has packet loss and latency metrics indicative of a good quality state, and has at least one characteristic that identifies the first network path as a candidate backup network path, wherein the first network path is marked as a backup network path and user data traffic is balanced among remaining network paths connecting the first user and the second user. Said control traffic is reduced for the backup network path to a second control bandwidth substantially less than the first control bandwidth that is used for each of the remaining network paths. The backup network path is selected as an active operating network path in response to determining the number of remaining network paths that are active has been reduced to less than or equal to a user configured minimum number.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 3A1 illustrates an exemplary APN having a conduit between an APNA1 at site1 with two WAN links and an APNA2 at site2 with one WAN link in accordance with an embodiment of the present invention;

FIG. 3A2 illustrates an exemplary APN having a conduit between an APNA1 at site1 and an APNA2 at site2 that have eight unidirectional paths in accordance with an embodiment of the present invention;

DETAILED DESCRIPTION

Figure 1A:
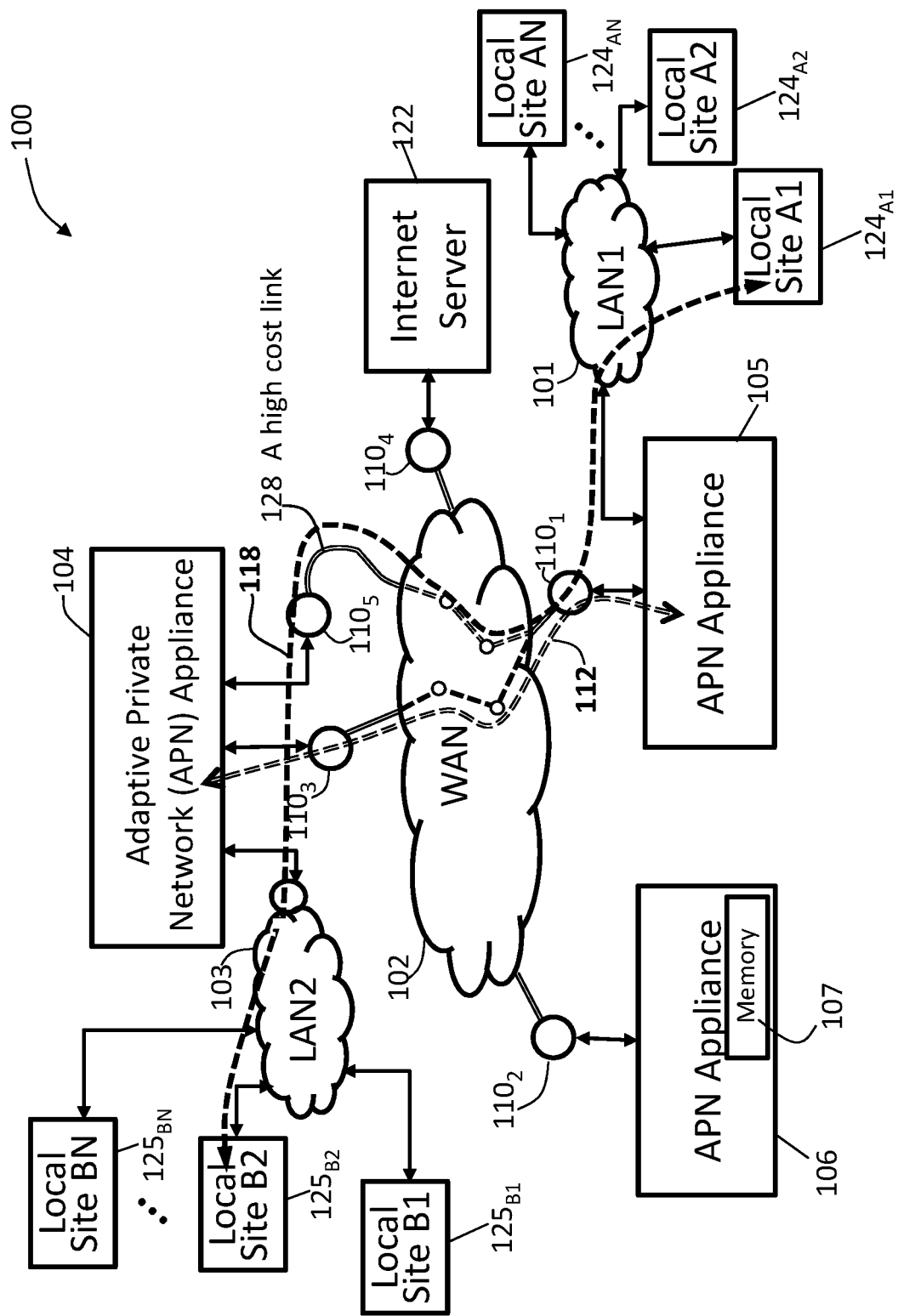
FIG. 1A illustrates an adaptive private network (APN) with APN network service paths in accordance with an embodiment of the present invention.

FIG. 1A illustrates an exemplary adaptive private network (APN) 100 having local sites $124_{A1}, 124_{A2}, \ldots 124_{AN}$, local sites $125_{B1}, 125_{B2}, \ldots 125_{BN}$, on local area networks, LAN1 101 and LAN2 103, respectively, coupled to a wide area network (WAN) 102 under control of the APN showing service paths in accordance with an embodiment of the present invention. The APN 100 includes one or more wide area networks (WANs), such as WAN 102, APN appliances (APNAs) 104-106, WAN routers $110_1$-$110_3$, and network application services as well as APN conduits between the APNAs, as described in more detail below. The APN is configured from a single APNA acting as a network control node (NCN) that provides a single point of control for the APN. First, however, a number of terms used herein are defined with the meaning they have when used in the context of the present invention.

An APN path, also referred to as a regular path, is a logical connection established between two WAN links located at different geographic sites across a WAN where one WAN link sends traffic to the other WAN link. Since Paths are unidirectional entities having one sender and one receiver, two WAN links that are connected to each other will have two paths between them. Each WAN link sees one path as being its transmit path and the other as the receive path. A regular path is used to send user traffic under normal circumstances.

An APN conduit is a virtual connection between two APN nodes, also referred to as client sites, and formed by aggregating one or more APN paths and their allocated WAN link resources. A conduit service is a logical combination of one or more paths. A conduit service is typically used for enterprise site-to-site intranet traffic, utilizing the full value of the APN. With a conduit service, depending on configuration, traffic is managed across multiple WAN links to create an end-to-end tunnel. The conduits overlay a virtual network on top of the underlying network.

A conduit maximum transmission unit (MTU) is defined as a minimum link MTU of the one or more APN paths in the conduit between a source site and a destination site.

An APN appliance (APNA) is a device that contains APN client site functionality including software modules which governs its participation in an APN. A high availability (HA) site contains two APNAs, one that is active and one that is in a standby mode of operation and available to become active in place of the other APNA if required.

A WAN link represents a physical access point to the wide area network (WAN), such as a digital subscriber line (DSL) connection or a cable modem. The distinctive characteristic of a WAN link is the bandwidth, or in other words, the amount of data capacity available for transmission and reception. WAN links can be shared among APN conduits, and intranet and Internet network services. In the present embodiments, the APN appliances do not directly attach to WAN links. APN appliances communicate with WAN links through logical connections, such as the WAN routers $110_1$-$110_3$ of FIG. 1A.

A regular WAN link is a WAN link configured in an active mode, which is the default mode for the WAN link.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

A local WAN link (LWL) is an APN client site's access point to a WAN. A site A's LWL is coupled to a corresponding remote WAN link for a site B. For a conduit between a site A and a site B, site A's local WAN links are site B's remote WAN links.

An Internet service is used for traffic between an enterprise site and sites on the public Internet. Internet traffic is not encapsulated. During times of congestion, the APN manages bandwidth in the network by rate-limiting Internet traffic relative to traffic on a conduit taking into account the network configuration established by an administrator.

An intranet service is used for any portion of enterprise intranet traffic that has not been defined for transmission across a conduit. As with Internet traffic, the intranet traffic remains un-encapsulated, and the APN manages bandwidth in the network by rate-limiting the intranet traffic relative to other service types during times of congestion. Note that under certain conditions, and if configured for intranet fallback on the conduit, traffic that ordinarily travels via a conduit may instead be treated as intranet traffic in order to maintain network reliability. Since conduit traffic is site-to-site, customers generally have a way to deliver this site-to-site traffic without the conduit. This un-encapsulated service, called an intranet service, does not receive the benefits of the conduit. If the conduit tunnel cannot be brought up, then routes which use that conduit are ignored and this means that traffic that would have used the conduit are redirected to use an un-encapsulated site-to-site transport method.

A routing domain represents a segmentation of a network. Traffic can only flow within one routing domain, not across routing domains. Separate routing domains may be set up based on segmentation of traffic within an enterprise for security reasons, as when a guest network should be fully segmented from an employee network. In another example, separate routing domains may be set up based on segmentation of traffic within an enterprise for manageability reasons, as when a large corporation organizes its network into distinct routing domains. Also, traffic within a very small aperture terminal (VSAT) satellite network may be segmented into separate routing domains to support multiple tenants at a client site. In a further example, traffic may be segmented within a managed service provider network to separately support multiple customer networks.

A static conduit is a conduit configured in a configuration file and created at startup time of an APNA. A static conduit is not removed without changing the configuration file.

A dynamic conduit is a conduit created between APN clients when needed and which can be removed when no longer needed.

In one embodiment, a software application is an abstraction to allow flows to be grouped together. A criterion that is used to group flows together may vary depending on the intended use. Some organizations may want to group all flows that interact with a company's web domain, such as a sales domain by use of a software sales application, while other organizations may want to view the software sales application as an Internet web browsing application that also includes access to other domains. For example, email is usually used extensively and is also generally considered very important, so it would be reasonable to view a product such as an email software manager as an application. In this scenario, the software sales application would include flows from an email software manager client as well as the email software manager web application web-page.

A WAN application (WANapp) virtual machine is an optimization device, such as a device that provides one or a plurality of selectable compression algorithms that are applied to communication traffic.

A web cache communication protocol (WCCP) is an exemplary protocol for use as described in more detail below. It is appreciated that an alternative protocol may be utilized having similar or different capabilities depending upon a particular software application of the embodiments described herein.

An APN service is a set of processing steps performed on packets that are transmitted through the APN. As illustrated in FIG. 1A, data traffic that moves through the APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN client site may have multiple APN conduits that connect to remote APN client sites. For each APN conduit there exists a separate APN service instance for the APN conduit service type.

An APN conduit service associated with path 112 manages network traffic packets that are transmitted through the APN 100 from the APN appliance 105 through router $110_1$, through the WAN 102, through another router $110_3$ to APN appliance (APNA) 104. The APN conduit service for path 112 operates on both APN appliances 104 and 105. The APN conduit service sends and receives data between a first geographic location that has the APNA 105 and a different geographic location that has the APNA 104 utilizing the full benefits provided by the APN conduit service for WAN resource allocation and network adaptation.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 118 is used to send and receive data between a first geographic location that has the APNA 105 and a different geographic location that has the APNA 104. For example, traffic using the APN Internet service may be associated with a network user accessing a public Internet web server 122. The path 118 has a first point in one of the local sites $125_{B1}$, $125_{B2}$, . . . , $125_{BN}$, such as local site $125_{B2}$ and an end point at local site $124_{A1}$. The service path 118, begins at $125_{B2}$ proceeds over LAN2 103 to APNA 104 to a router $110_5$ that connects to a high cost link 128, such as a wireless satellite link, and then connects to WAN 102 to router $110_1$ to APNA 105 to LAN1 101 and to local site $124_{A1}$. The cost of using the high cost link between router $110_1$ and $110_5$, such as a satellite link, is much greater than that of using a lower cost link, such as path 112 connected between router $110_1$ and $110_3$.

A conduit comprises multiple paths. A path is formed between 2 WAN links associated with the conduit. Each path in each conduit in the APN is monitored for quality of communication by collecting quality metrics such as packet loss and latency. This monitoring is done by way of control messages and is done on each path whether the path is used to transmit user traffic or not. Accordingly, no path is completely free of traffic unless it is not operational. Since all paths within a conduit are being measured whether there is user traffic through the path or not, the conduit maintains up to date per-path metrics that are used by the APN to select the best network path to transmit user data. In some network configurations, WAN links with high cost, such as 4G cellular links, have been used as backup links. These high cost backup links are meant to be used only when all other links fail. While the APN can be configured to avoid using these high cost backup links for user traffic, the control traffic necessary to monitor the quality of paths using these high cost links is still necessary. As a result, the cost of operating these types of links even in standby is excessive. For example, even in a simple network with two sets of bi-directional paths per site, the control traffic consumes about ten gigabytes of usage per month per site. With high cost links, such as 4G cellular links, a large network incurs a lot of expense. Replacing these high cost standby links with a standby WAN link as described herein, significantly reduces the amount of data consumption for control traffic. In one case, this reduction amounted to a factor of twenty reduction in costs.

Dynamic conduits address changes in statically configured networks that are not just slow, gradual changes in network usage, but are happening in real time throughout a day across a network which may be global. In real time, dynamic conduits dynamically optimize network performance adapting to changing communication patterns between nodes in the network. Dynamic conduits can also be used to offload traffic from intermediate nodes that may be experiencing congestion.

An adaptive private network (APN) software product according to the present invention runs as a centralized management system within a virtual machine to create APN configurations and to monitor system resources, analyze system resources, and manage a configured APN in operation as addressed further herein. The centralized management system also includes capabilities that provide discovery, timestamp correlation, and database schema migration processes of the present invention. The APN software of the invention, also referred to as APN virtual machine (VM) software, provides analysis and monitoring capabilities that are timely with respect to events to be tracked and monitored while the APN is in operation and provides storage for historical data as taught further herein. The APN system, also referred to as an APN VM system, reduces the time to configure APN appliances and the number of errors that can occur in configuring a system, as well as, to provide detailed performance data correlated across the WAN. The APN system further allows a centralized virtual single point of control by a network control node (NCN) for a physical network in which the NCN provides system wide timing synchronization. The centralized single point of control is not limited to a central location within a network of nodes, may be at any point within the network, and may be coupled at a point that would be considered outside the boundary of a network. Centralized indicates the single point of control aspects of the APN as described further herein.

An onboard configuration facility is a software component designed to plugin to the APN system of the invention and provide an APN configuration compiler, APN configuration editing capabilities, and to provide an ability to create and edit network maps that show nodes of the APN and conduits between the nodes. Each version of the APNA software produces a version of the onboard configuration facility that understands an object model and configuration options for that version of APNA software. The APN system supports installation of multiple concurrent onboard configuration facility plugins so that a single APN software version can manage a variety of APNA software configuration versions. Each version of APNA software, the appliance code, is provided with a default version of the configuration facility, which is also referred to as a configuration plugin. Multiple configuration plugins may be installed. So, the term "onboard" is in reference to the configuration facility or "plugin" when it is running on the APN VM system or on an NCN.

An onboard configuration editor is a component of the onboard configuration facility that represents an APN configuration as a hypertext markup language (HTML) tree and accepts changes to the APN configuration from a user. The onboard configuration editor is closely coupled with a configuration compiler to make changes to the configuration HTML tree. The onboard configuration editor also integrates with a network map facility to display site nodes in a visual map representation of the APN.

An APN configuration file is a text file which describes a configuration of the APN. This configuration file serves as an input to the configuration compiler which generates registries for each APNA in the network.

The configuration compiler is a software program, such as a Java™ program, that can run on an APN system and converts an APN configuration file into either registries for use by APNAs or into an extensible markup language (XML) representation of the object model for use by the onboard configuration facility.

A configuration package is a software data file which contains the APN configuration file along with metadata. Such metadata includes the network maps that are derived from a specific APN configuration.

An onboard configuration facility package comprises the onboard configuration facility in a format which can be installed onto the APN system.

Adaptive private network appliance (APNA) settings are management settings that can be set directly on an APNA. These APNA settings include time parameters, such as for a time zone or time zones and for network time protocol (NTP) including an NTP server address, settings for a Netflow server, user authentication, simple network management protocol (SNMP), event handling, and periodic status reports. These APNA settings are generally not configurable through the APN configuration file. Rather, the APNA settings are managed on a network-wide basis through the APN controls and software of the invention.

A dashboard, in the context of the APN system, is a user configurable display screen which may be customized to display a subset of items from the rest of the APN system. Multiple dashboards may be created with one being chosen as a default home screen for a particular user.

Workspaces are a construct which allow a user to organize a set of objects, allowing the user to save and recreate a state of a management session. Workspaces are used in a similar manner to use of a "project" in a software integrated development environment (IDE) which collects a set of source code files and associated build scripts and resources such as help text and images to create a complex graphical application.

WAN virtualization, as described herein, enables multiple WAN connections to replace individual private WAN connections, such as Internet WAN links, and perform bandwidth aggregation with improved performance while minimizing impact of WAN links with different or changing latency, jitter, and packet loss metrics.

WAN optimization, as described herein, generally utilizes compression, caching, and other techniques to improve data transfers across a network.

A flow is defined by an n-tuple comprising <IP source address, IP destination address, IP protocol number, transmission control protocol (TCP)/ user datagram protocol (UDP) source port, if the IP protocol is TCP or UDP, TCP/UDP destination port, if the IP protocol is TCP or UDP>. Depending on the context, other items could be added to the tuple including: a differentiated services code port (DSCP) tag, a routing domain, and a service identifier, and the like. Also, a flow is unidirectional. For example, if nodes A and B are communicating, there is a flow that represents traffic from A to B and a flow representing traffic from B to A.

Figure 1B:
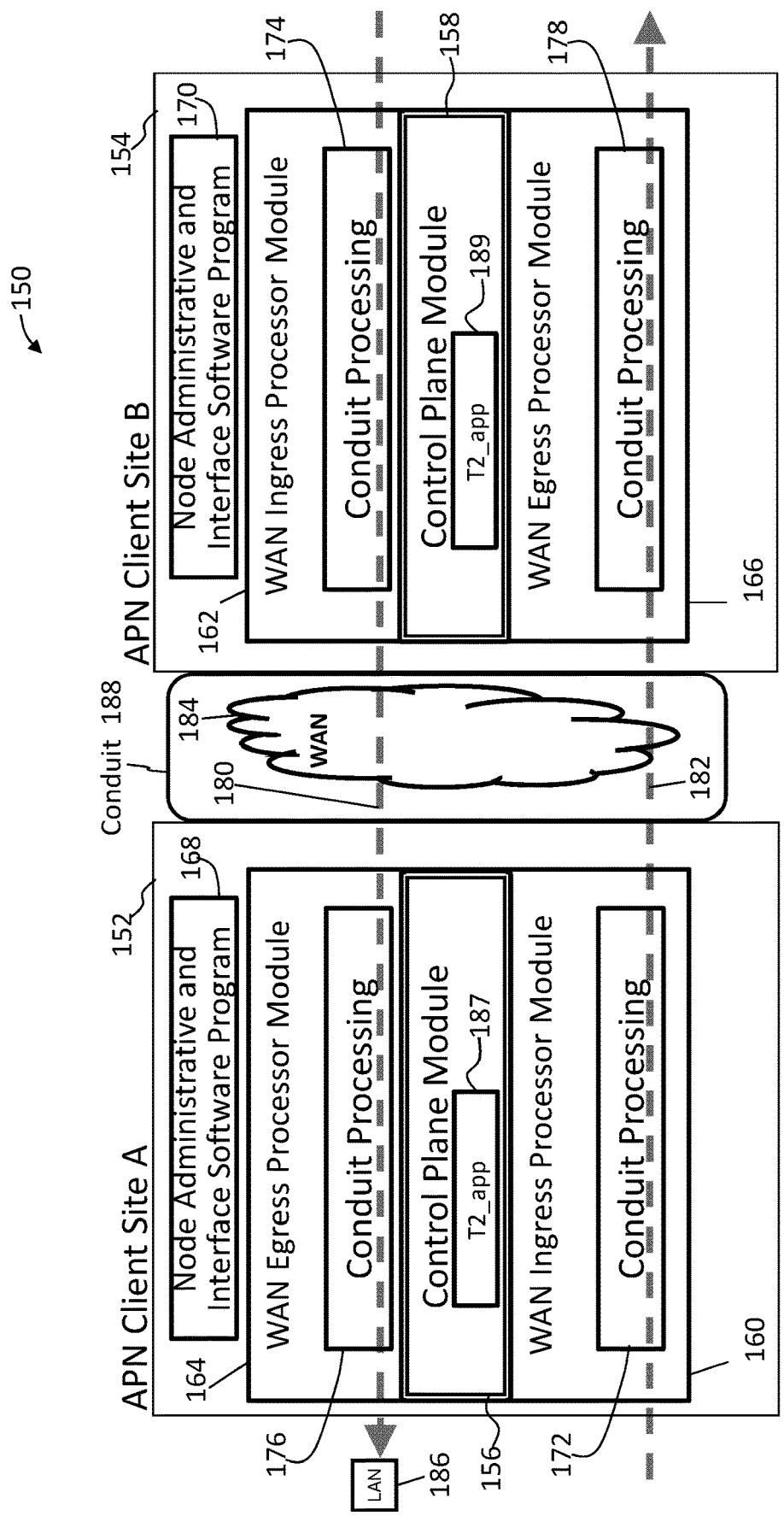
FIG. 1B illustrates an adaptive private network (APN) conduit two-ended service system between a client site A and a client site B in accordance with an embodiment of the present invention.

FIG. 1B illustrates an adaptive private network (APN) conduit two-ended service system 150 between an APN client site A 152 and an APN client site B 154 in accordance with an embodiment of the present invention. Each APN client site is also considered a node in the APN and contains a collection of software modules which govern its participation within the APN. The software modules for the APN client site A 152 and the APN client site B 154 include control plane modules 156 and 158, WAN ingress processor modules 160 and 162, WAN egress processor modules 164 and 166, and node administrative and interface software program modules 168 and 170, respectively. As illustrated in FIG. 1B, the WAN ingress processor modules 160 and 162 include conduit services 172 and 174, and WAN egress processor modules 164 and 166 include duplicate conduit services 176 and 178. Intranet service, Internet service, and pass through service are also provided at each APN client site. Each APN service type, including conduit, intranet, Internet, and pass through service types, implements processes for each type of data traffic that is communicated to and from the WAN respectively.

As illustrated in FIG. 1B, APN conduit traffic, identified by bold dashed arrow paths 180 and 182, flows through the two APN client sites 152 and 154 as the traffic traverses the APN. WAN ingress processing module 162 of APN client site B 154 performs the WAN ingress conduit service processing 174 prior to transmitting the traffic 180 via the WAN 184 to the APN client site A 152. WAN egress processor module 164 of the APN client site A 152 performs the WAN egress conduit service processing 176 prior to transmitting the traffic 180 to the node or nodes located on LAN 186. The binding of one APN client site's WAN ingress conduit processing 174 to the peer APN client site's WAN egress conduit service processing 176 constitutes an APN conduit 188 in which traffic is actively monitored and managed across multiple WAN resources. The t2_apps 187 and 189 are control programs that run on each APNA communicating with other APNAs in the APN while forwarding user data.

The APN is capable of using disparate asymmetric WAN links which frequently vary in behavior with respect to bandwidth, latency, jitter, packet loss and congestion over time. For example, the APN can use an asymmetric DSL WAN link that transmits data at 512 kbps upstream to the WAN and 6 Mbps from the WAN through the public network combined with a private symmetric leased circuit T1 WAN link that transmits data at 1544 kbps upstream and downstream and a cable broadband connection that transmits data at 312 kbps upstream to the WAN and 3 Mbps from the WAN to a peer having adequate aggregation bandwidth of these rates for a single transmission control protocol (TCP) file transfer session at a theoretical transmit rate of 2368 kbps and receive at 10544 kbps or 10.544 Mbps. Practically, under good network behavior, the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In path selections, conduit paths are evaluated and the best available path is selected. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen. A "one way time" (OWT) refers to the amount of time it takes for a packet to traverse a network from source to receiver. In the context of this invention, the one way time is measured by subtracting a receive time stamp from a WAN egress module 166 from the send time stamp from a WAN ingress module 160, FIG. 1B.

Figure 1C:
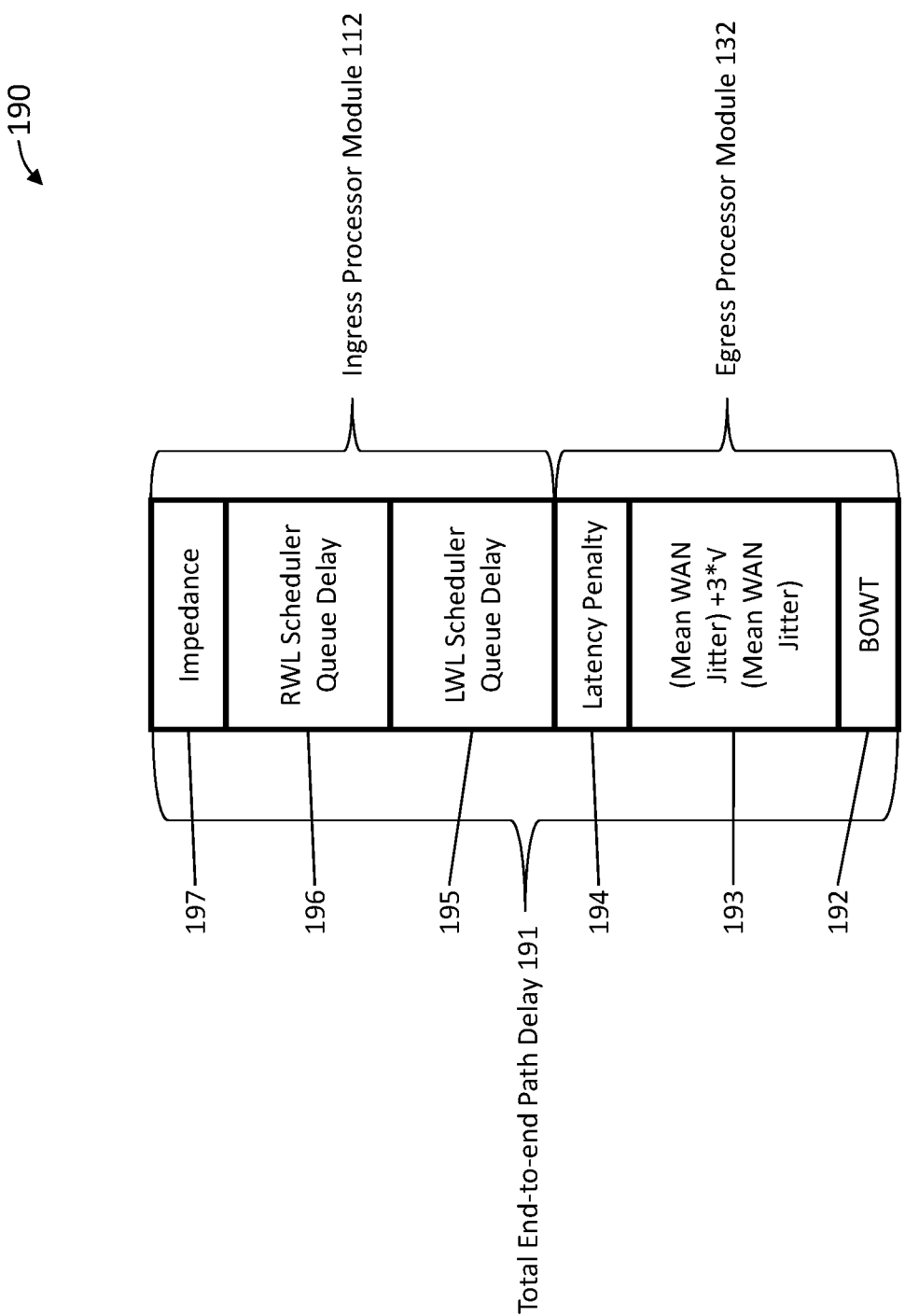
FIG. 1C illustrates exemplary factors used to determine the total end-to-end path delay in accordance with an embodiment of the present invention.

FIG. 1C illustrates exemplary factors 190 used to determine the total end-to-end path delay 191 in accordance with an embodiment of the present invention. The term "best one way time" (BOWT) refers to the lowest measured OWT for a particular packet on a particular path over a period of time. Initially, the evaluation process chooses one best path based on path latency which is calculated using a best one way time (BOWT) 192, mean WAN jitter 193, latency penalty for short term instability 194 and WAN link schedulers' queue delay times 195 and 196, with additional preferential treatment referred to as impedance 197 applied to any prior primary path for the APN traffic flow, if a primary path exists. Thus, an exemplary formula for estimating total end-to-end path delay is the BOWT 192+(mean WAN jitter 193)+3*($\sqrt{}$mean WAN jitter 193))+latency penalty 194+ local WAN link (LWL) scheduler queue delay 195+remote WAN link (RWL) scheduler queue delay 196+impedance 197. The BOWT 192, mean WAN jitter 193, and latency penalty 194 are provided by a remote APN conduit state resulting from control messaging from the egress processor module 166 of FIG. 1B. The local WAN link scheduler queue delay 195, remote WAN link scheduler queue delay 196 and impedance 197 are provided by the WAN ingress processor module 160 of FIG. 1B. U.S. Pat. No. 8,125,907 filed on Jun. 11, 2009 entitled "Flow-Based Adaptive Private Network with Multiple WAN-Paths" and incorporated by reference herein in its entirety provides further exemplary details of a presently preferred approach to timing and network control in an adaptive private network (APN) at col. 6, line 1-col. 19, line 27, for example.

APN path processing services are responsible for providing a means of communicating user data and control information from one APN node to another APN node across the network. In particular, user data and control information may be transmitted from the WAN ingress processor module 160 of one APN node across the WAN and received at the WAN egress processor module 166, as shown for example in FIG. 1B. Exemplary APN path services which may suitably be provided are listed below:

1. Universal path tagging of all conduit traffic sent across the WAN with high resolution and highly synchronized APN time stamps to enable the highly predictive estimation of transmission latency and statistical variation of latency, subsequently in parallel, a control plane module's path state monitoring service is used to detect optimal paths for traffic to use across the APN.

2. Use of the above optimal path identification to provide, in tandem with a WAN link accounting module, WAN bandwidth reallocation from low performing paths to higher performing paths.

3. Universal path tagging, of all conduit traffic sent across the WAN APN path with path sequence numbers, enables sub second detection of packet loss enabling fast retransmission of user packets with little to no negative effect to the end users.

4. Continual monitoring of and characterization of network behavior at times of lower utilization using heartbeats for fast reaction when network demand does arrive, such as provided by a heartbeat generator.

5. The ability to identify and proactively solicit retransmission when network traffic has been extraordinarily delayed or if the network has ceased to function using a nag method, as provided by a nag process, operating on the path state monitoring module.

6. Universal path tagging of all conduit traffic with network utilization and non-utilization of WAN link resources enabling early detection and avoidance of network congestion prior to the packet loss that is typical of normal TCP like congestion methods.

7. The ability to transmit time sensitive control messages without typical internal scheduling delays for software process staging to rate schedulers, while still maintaining proper long utilizations to the APN network to do retransmission of lost packets without the highly predictive estimation of transmission latency and statistical variation of latency.

The APN client node uses timing data to adjust or calibrate a network time by using a linear algebraic calculation based on the slope-intercept form. In a current implementation, y is the time at an APN control node, also referred to as a network control node (NCN), and x is the client node local time, b is the base offset between the two, and m is the rate of change of y versus x which is the slope. Using these definitions, an equation in slope-intercept form y=mx+b is expressed as network time=slope*client local time+base.

The slope is calculated by taking two samples over a pre-specified period and averaging the samples together. The base offset is calculated by taking the difference of the value between the network control point time and the client time, adjusted for one half round trip time (RTT).

Using queuing theory, Poisson distribution assumptions, and a highly accurate APN wide APN clock sync that allows for accurate one way time measurement, a method is provided that is typically capable of estimating path latency and statistical jitter with an accuracy approaching ~99%. An equation which may be suitably used is best one way time (BOWT)+(Mean WAN Jitter)+3*(√(mean WAN jitter)). This equation provides a very accurate inference with just a few samples of traffic over a short period.

A path state represents the most current condition of the network path as determined by feedback received by the WAN egress APN node's path state monitoring process. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path's packet loss thresholds over numerous durations nearly simultaneously and continually while still maintaining low processor overhead. This aspect is obtained through the universal path tagging of conduit traffic sent across the WAN with high resolution and highly synchronized APN time stamps to enable the highly predictive estimation of transmission latency and statistical variation of latency. In tandem, a control plane module's path state monitoring service is used to detect packet loss and optimal paths for traffic to use across the APN. The result is an ability to detect a difference between occasional incidental short term network loss and long term persistent problems.

In a presently preferred embodiment, the APN node's software modules at a client site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as utilized in an adaptive private network (APN) appliance (APNA), a rack mounted processing device, a personal computer, a server, or the like, having one or more central processing unit devices. The processor and memory complex, for example, may be configured to execute instructions that access data and operate on data under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM), flash memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN client site) contains software modules supporting participation in an adaptive private network. An APN node may exist in one or more APN appliances at a location. An APN node contains a collection of software modules executed by a processor and memory complex located in the APN node which govern the APN node's participation within an APN such as control plane modules 156 and 158, WAN ingress processor modules 160 and 162, and WAN egress processor modules 164 and 166 in FIG. 1B. The control plane module is responsible for controlling and participating in the control of the APN node in tandem with other APN nodes in the network.

The WAN ingress processor module 160 may suitably be embodied as software and hardware components responsible for processing network traffic for transmission from a local area network (LAN) to a WAN. The WAN egress processor module 164 may suitably be embodied as software operating on hardware components, such as a processor and memory complex that is responsible for processing network traffic for transmission from a WAN to a LAN. WAN ingress and WAN egress processor modules are discussed in further detail below. The APN client site's control plane module 156 may suitably be embodied as software operating on hardware components, such as a processor and memory complex that utilizes the APN client site's WAN ingress processor module 160 and WAN egress processor module 164 as the means for transmitting and receiving APN node to APN node control data across the WAN.

Software packages for an APN are distributed through the WAN using control packets, termed Tapplication protocol (TAP) packets, that are utilized as part of change management software. Software packages may also be distributed through administrative interfaces, such as downloading software using interfaces 168 and 170 to the APN client sites. The TAP is a protocol for messages that are sent through the WAN to allow processes outside of t2_app on different appliances to communicate with each other. TAP can be considered to operate as a point-to-point or Ethernet like device which, instead of receiving packets from physical media, receives the packets from a user program and instead of sending packets via the physical media, writes the packets to the user program. The t2_apps 187 and 189 of FIG. 1B are control programs that run on each APNA communicating with other APNAs in the APN while forwarding user data. After a software update, the APN services on the APN client sites 152 and 154 are then restarted thus bringing the APN software node configuration into synchronization.

Figure 2:
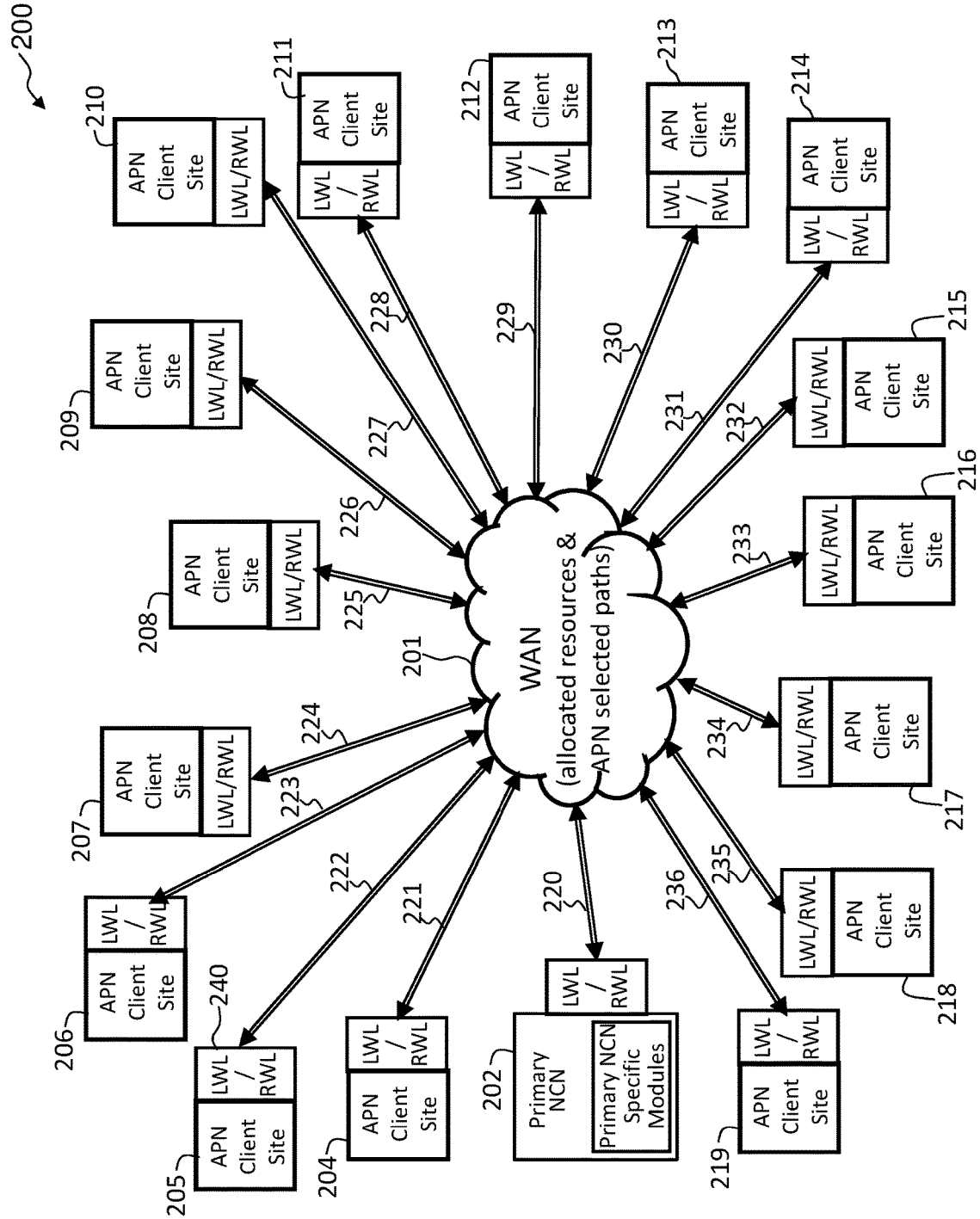
FIG. 2 illustrates an APN having an APN network control node (NCN) and sixteen APN conduits coupled to sixteen APN client sites in accordance with an embodiment of the present invention.

FIG. 2 illustrates an APN 200 having an APN network control node (NCN) 202 coupled to conduit section 220 and sixteen APN conduit sections 221-236 coupled to sixteen APN client sites 204-219, respectively, in accordance with an embodiment of the present invention. As illustrated in FIG. 2, in a presently preferred embodiment, APN 200 is centrally configured. A network administrator configures the entire APN 200 through an APN configuration file that is processed by the NCN 202. The NCN 202 then distributes the configuration settings to all client sites in the APN 200. This method of configuring the APN 200 is intended to provide benefits to the administrator by providing a single point of configuration to the network. It also assures configuration consistency and compatibility for all APN client sites in the network nearly simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a mapping of the APN resources and their initial allocations. Furthermore, the centralized configuration can provide information and warnings to the administrator as to the behavior of the configuration that may not be obvious or intended from the configuration, before loading the configuration onto a production network.

Each of the sites 204-219 and primary NCN site 202 contains an APN appliance to provide APN functionality. The configuration of the APN 200, generally provides for connectivity between a site A, such as site 205, and a site B, such as site 208, where the connectivity from the site A's perspective is site A→LWL→"WAN"→RWL→site B. The connectivity from the site B's perspective is site B→LWL-→"WAN"→RWL→site A. The WAN 201 represents allocated WAN link resources and APN selected paths. In FIG. 2, a conduit between a site A and a site B is formed by use of the conduit sections 222 and 225 and is a virtual connection between the corresponding site A and site B. The conduit includes a collection of paths and encompasses a path from a local WAN link (LWL) at site A→"WAN" →RWL at site B.

In one presently preferred embodiment, APN conduits exist between the NCN and, for example, sixteen APN client sites as shown in FIG. 2. It will be recognized that while sixteen APN sites are shown for purposes of illustration, a larger or smaller number of potential APN client sites may be suitably employed. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path, and the path with the lowest end to end time is chosen. If no path is in a path quality good state, then a path in a path quality bad state with the highest bandwidth is chosen. Bandwidth is re-balanced among paths in the group upon every path state change if the regular path group is active. However if a backup path group is active, only the path that is in the highest quality state and has the highest bandwidth is chosen.

The sixteen client sites 204-219 of the exemplary APN 200 are generally located remotely from each other and may include geographically diverse client sites. A site would be defined as remote if the devices are physically in different locations such as different buildings, cities, states, time zones or countries. For example, the primary NCN 202 may be located in a company's headquarters location in a first country with client sites 204-209 and client sites 217-219 also located in the first country. The other client sites 210-216 may be located in a second country.

As used herein, an APN appliance is a device that contains APN node functionality according to software modules, such as the control plane modules 156 and 158, the WAN ingress processor modules 160 and 162, and the WAN egress processor modules 164 and 166, as described in more detail above with reference to FIG. 1B. The sixteen client sites 204-219 are coupled by conduit sections 221-236, respectively, and the conduit sections may be connected together to provide a configurable virtual connection between two connected APN appliances at the client sites. It is noted that while sixteen client sites 204-219 are illustrated, an APN may support as many client sites as are required.

A network control point (NCN) 202 of FIG. 2 is an administration point for the APN 200. In one embodiment, the NCN 202 resides within an APN node. An APN control node refers to an APN node that also performs as the network control point of the APN. In another embodiment, an NCN resides in an appliance that is separate from an APN node and administers and controls the APN nodes within the APN. The NCN provides administrative and control functions to the APN, including but not limited to, distribution of configuration objects to APN client nodes and time synchronization to the APN.

A dynamic conduit is a conduit created between APN clients when needed and can be removed when no longer needed, based on a configured first threshold and a configured second threshold. For example, client site 205 can be configured with two local WAN links, one from a first network provider and one from a second network provider. Multiple conduits may be connected to site 205 which may be configured to use one or both of the local WAN links. In an exemplary scenario where all of the conduits that are connected to site 205 use both local WAN links, then when usage for either local WAN link passes the configured second threshold, creation of a dynamic conduit can be triggered. The first and second thresholds refer to bandwidth levels passing through an intermediate site.

Software code referenced as t2_app provides processes that forward data traffic and control protocols related to conduits. The t2_app code currently comprises five directories control, forward, manage, platform_api, and common, though not limited to this number of directories. The control directory holds the code related to the control protocols used by t2_app for conduits. The forward directory contains the code that is responsible for moving packets through the system. The manage directory has code that deals with the management plane. The platform_api code is responsible for interfacing with the hardware and the common directory has code which is not specific to any of the other directories.

An APN traffic flow is the administrator designation for network session traffic that is identified to a particular APN flow record. APN traffic flow requirements are administrator-configured requirements that govern an intended behavior of an APN as it pertains to an APN traffic flow. For example, APN traffic flow requirements may comprise a persistent path flow requirement, a duplication flow requirement, and a reliable flow requirement.

An APN flow record is held in the memory of an APN appliance. An APN flow record tracks a defined APN traffic flow, ensuring that the APN traffic flow's prior-configured requirements are followed. The APN flow record contains both the APN traffic flow requirements and the APN traffic flow's state. The requirements of a particular APN flow record are derived from the routes and service rules that the APN traffic flow matches. The state of APN flow record includes, but is not limited to, APN service type, APN service instance, information pertaining to the last APN path selected, current APN flow sequence number, time of last packet received, time of last packet transmitted, counts of number of packets and number of bytes processed, sets of pending packets for sequence reordering, sets of pending packets for fragmentation, and sets of historical records for packets previously processed.

The control directory includes an APN memory subsystem, which is a distributed shared memory system that allows a data structure on one appliance to be pushed over a conduit to an appliance on another site. A conduit path manager deals with sending and receiving transmission quality reports (TQRs) between sites. The TQRs are sent using the APN memory subsystem. A geographically diverse process handles a state machine controlling primary and secondary standby NCNs in geographically diverse regions. The t2_app also handles management of flows in the system. The flows are stored in a hash table and references are counted so that it is known when it is safe to free a flow data structure. As packets are passed through t2_app, they hold a pointer to the flow so flows are not freed until it is known that there are no more users of that flow in the system. For a conduit to work properly, it is important that both ends of the conduit have the same notion of time. The t2_app provides a time synchronization protocol that is implemented in each node of the APN system. The t2_app also provides a process for tracking of traffic usage on a WAN link. In particular, this tracking process includes a task that wakes up every 100 ms, for example, and examines the current allocation of bandwidth on a WAN link and compares it to the actual usage. The data provided by this tracking process allows the bandwidth to be adjusted regularly so that demand can be met. The t2_app also implements a versioning protocol that sites use to make sure they are compatible before bringing up a conduit. This protocol is leveraged to do a key exchange and to rotate encryption keys while the conduit is in operation. The t2_app also implements a high availability (HA) protocol between two appliances serving a site. Various operations use customizable rules which are processed by the t2_app. Further, the t2_app also processes routes by using a route_cache so that once a route has been looked up and determined, a hash based lookup can search for the route in a cache. In one embodiment, route caches are local to a thread so that locking does not need to be done, resulting in fast route lookups. A version number is kept on the main route database and incremented anytime a change is made to the route table. This approach allows threads to detect when their route cache has data that is out of date.

The manage directory provides for processes in the APNA supporting sending of commands to the t2_app to perform actions or retrieve information. These actions can include things like enabling or disabling paths or conduits, pinging an address, or notifications about changes to the system made by the management tools. A rich debug interface to t2_app is also provided. The t2_app also provides a way for applications external to the t2_app to send commands to a remote site through the conduit, which is used, for example by change management processes. The t2_app provides support for the NCN to distribute learned public IP addresses to other sites to enable client to client conduit communications when both clients are behind a network address translation (NAT) and the public IP address is not known in advance. This mechanism uses the APN memory subsystem to distribute the messages. The t2_app further supports client operations to inform the NCN of their management IP address. Thus, a user interface on the NCN can be utilized to provide links to navigate to a client appliance. This approach also allows an APN VM system to discover the management IP addresses of all appliances in the network when it communicates with the NCN.

The t2_app is configured according to a multi-threaded pipeline model, wherein each stage of processing is accomplished in a separate thread. The threads hand off packets to each other through queues. The multi-threaded architecture of t2_app allows platforms with multiple CPUs to spread the processing of a packet across the multiple CPUs, which allows performance of the t2_app to scale as more CPUs are made available.

FIG. 3A1 illustrates an exemplary APN 300 having a conduit between an APNA1 at site1 302 with two WAN links and an APNA2 at site2 312 with one WAN link in accordance with an embodiment of the present invention. A conduit is a logical container of paths between two adaptive private network (APN) sites. A path is a unidirectional logical pathway along which packets flow from one WAN link to another. Generally, a path originates from one WAN link, goes through multiple routers in the WAN, which is, for example, a private multiprotocol label switching (MPLS) network or the public Internet, and terminates on another WAN link, generally at a remote location from the originating point. Regarding FIG. 3A1, four paths can be formed in the APN between site1 and site2 using three WAN links WL1 305, WL2 307, and WL3 309. These paths may be automatically generated by a configuration editor in the APN or manually created by a user of the APN. Four unidirectional paths in FIG. 3A1 are WL1 to WL3, WL2 to WL3, WL3 to WL1, and WL3 to WL2.

In FIG. 3A2 an exemplary APN 350 is illustrated having a conduit between an APNA1 at site1 352 and an APNA2 at site2 362 that have eight unidirectional paths, WL1 to WL3, WL1 to WL4, WL2 to WL3, WL2 to WL4, WL3 to WL1, WL3 to WL2, WL4 to WL1, and WL4 to WL2, in accordance with an embodiment of the present invention. A WAN link that is configured for operation is by default active. A WAN link that is marked as standby within the APN configuration editor, by the user for example, is a standby WAN link. A backup path is a path that is formed using one or two standby WAN links. User communication traffic is controlled to not flow on a backup path or paths when the backup path or paths are not designated as active. When there is more than one backup path in a group of backup paths and the backup path group is active, only one backup path is designated as active and used to transmit the user communication traffic. The other backup paths in the group remain in a standby state. For example, in FIG. 3A2, if WL2 and WL4 are configured as standby, the paths in the APN 350 form into three groups. A path from WL1 to WL3 becomes part of path group 0 and is considered a regular path. A path from WL1 to WL4 and a path from WL2 to WL3 become part of path group 1 and are considered backup paths. A path from WL2 to WL4 becomes part of path group 2 and is considered a backup path. Also, a path from WL3 to WL1 becomes part of path group 0 and is considered a regular path. A path from WL3 to WL2 and a path from WL4 to WL1 become part of the path group 1 and are considered backup paths. Further, a path from WL4 to WL2 is part of path group 2 and is considered a backup path.

Figure 3B:
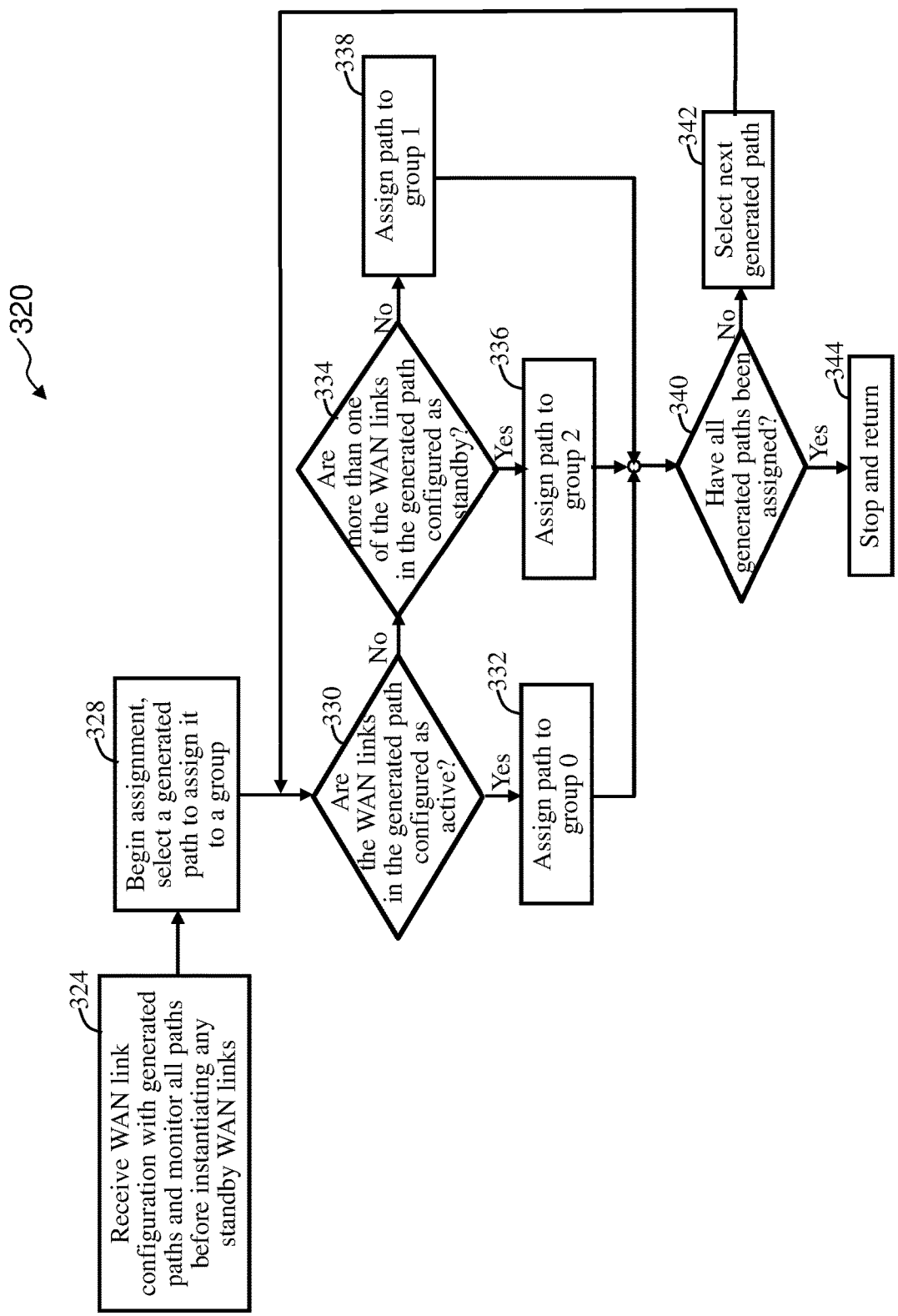
FIG. 3B illustrates an exemplary path assignment process for the paths generated in FIG. 3A2 in accordance with an embodiment of the present invention.

FIG. 3B illustrates an exemplary path assignment process 320 for the paths generated in FIG. 3A2 in accordance with an embodiment of the present invention. Once a network configuration is received, paths are generated based on a WAN link configuration. At step 324, such a network configuration may have, for example, the WAN link configuration of FIG. 3A2 having two WAN links, such as WL2 357 and WL4 363 configured as standby. Also at step 324, network paths in conduits identified by the configuration are generated. Further, at step 324, the generated paths are monitored at the same control messaging rate before instantiating any of the configured standby WAN links. At step 328, an assignment process is started to select a generated path, which may include zero, one, or more instantiated standby WAN links, and assign the selected path to a group. At step 330, a determination is made whether the WAN links in the selected network path are configured as active. In the four WAN link example of FIG. 3A2, two WAN links are used per unidirectional path, such as the path from WL1 to WL3 in path group 0, the path from WL2 to WL3 in path group 1, the path from WL1 to WL4 also in path group 1, and the path from WL2 to WL4 in path group 2, as described above. For this example, a determination is made at step 330 whether both WAN links are configured as active. If the WAN links in the generated path are both active, such as WL1 355 and WL3 359 per the example of FIG. 3A2, the process 320 proceeds to step 332. At step 332, the path is assigned to group 0. The process 320 then proceeds to step 340.

Returning to step 330, if the WAN links in the generated path are not both active, such as standby WL4 363 in the path WL1 355 to WL4 363 per the example of FIG. 3A2, the process 320 proceeds to step 334. At step 334, a determination is made whether one or more of the WAN links in the selected path are configured as standby. If the WAN links in the generated path are both configured as standby, such as standby WL2 357 and standby WL4 363 in the path WL2 357 to WL4 363 per the example of FIG. 3A2, the process 320 proceeds to step 336. At step 336, the generated path is assigned to group 2. The process 320 then proceeds to step 340. Returning to step 334, if the WAN links in the generated path are not both configured as standby, such as the path from active WL1 355 to standby WL4 363 per the example of FIG. 3A2, the process 320 proceeds to step 338. At step 338, the path is assigned to group 1. The process 320 then proceeds to step 340. At step 340, a determination is made whether all generated paths have been assigned. If all paths have not been assigned, the process 320 proceeds to step 342. At step 342, a next generated path is selected and the process 320 proceeds to step 330 to continue the path group assignment process.

Figure 4:
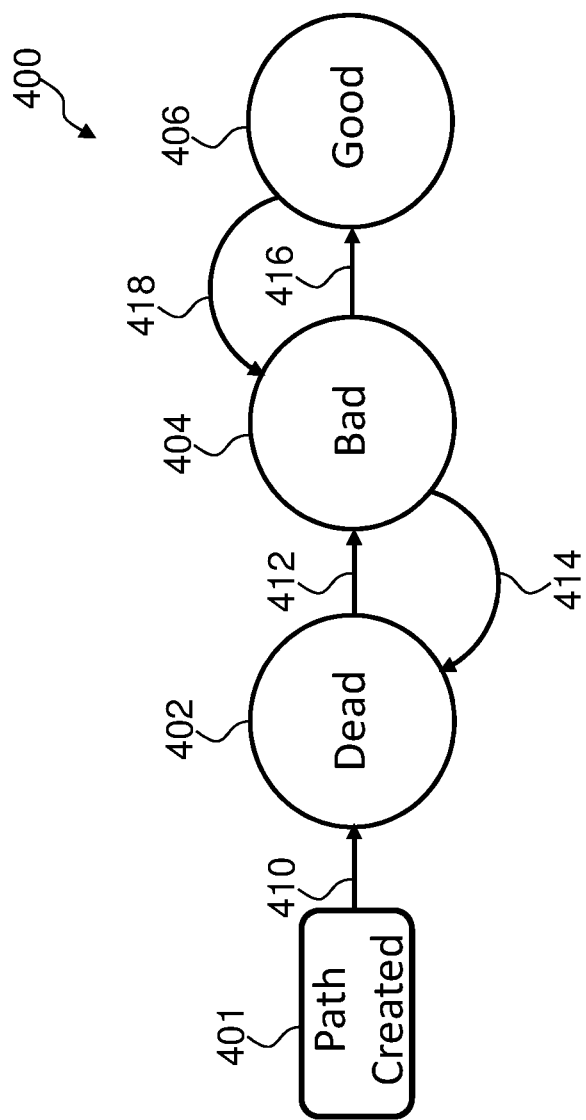
FIG. 4 illustrates a path state machine in accordance with an embodiment of the present invention.

FIG. 4 illustrates a path state machine 400 in accordance with an embodiment of the present invention. Paths, when not disabled, are in a dead, a bad, or a good state. A path in a dead state cannot carry any user traffic. A path in either a good or bad state can carry user traffic. A path is in a bad state when packet loss on the path exceeds a certain threshold or when no packets have been received for a period of time. The good state may also have sub-state levels of varying degrees of stability, packet loss and the like, however a path in a good state is considered a better quality path than a path in a bad state. When a path is created at operation 401, the path transitions 410 to a dead state 402. As soon as a packet is received, the path transitions 412 from the dead state 402 to a bad state 404. When enough consecutive packets are received without loss and a bad-to-good probation period has passed, the path transitions 416 from the bad state 404 to a good state 406. However, in the bad state 404, when no packets are received for a pre-specified silence threshold period ($t_s$), the path transition 414 from the bad state 404 back to the dead state 402. Paths in the good state 406 are monitored and if no packets are received for a pre-specified quiet threshold period ($t_q$), a no packet received for $t_q$ event, the path state machine transitions 418 from the good state 406 to the bad state 404. For paths that exceed a packet loss threshold, a packet loss exceeds a threshold event, the path state machine also transitions 418 from the good state 406 to the bad state 404.

Before a WAN link is instantiated as a standby WAN link, generally, every path in the APN, whether it is used to carry user traffic or not, is sent heartbeat messages at fifty msec. intervals when a path is in the good state, at twenty five msec. intervals when a path is in the bad state, and at two hundred and fifty five msec. intervals when a path is considered in the dead state. These specific time intervals are considered exemplary and not limiting. Other time period intervals may be selected. In addition to the heartbeat messages, other types of control traffic may also be transmitted on the paths in the APN. Such control traffic incurs an operational cost above the cost of transmitting user traffic. Such operational cost is reduced, and many times systems exhibit a significant cost reduction, by use of the standby WAN links according to embodiments as described herein.

Generally, in a conduit, a path with a standby WAN link and at least one active WAN link that is up, backup paths are inactive and do not carry user traffic. The only type of control traffic that is allowed on inactive backup paths are the heartbeat messages. The heartbeat interval on backup paths is pre-specified as one second, as a default setting, and can be changed by a user. A maximum interval is considered one minute.

In a conduit, when a regular path group (group 0) is active, typically multiple paths are used to carry user traffic. However, when a backup path group becomes active because, in one embodiment, all active WAN links in the conduit are down, only one backup path in the group becomes active, for example the backup path that has the highest state and highest bandwidth, becomes active and carries user traffic. This active backup path begins to use the same heartbeat message intervals as the regular paths and all control traffic is allowed on this path. Other backup paths remain in standby utilizing a heartbeat message interval at reduced backup interval settings, as noted in an example above. A selection criteria, used to choose which backup path to make active, depends on quality metrics and bandwidth associated with the paths. These quality metrics are the attributes of all paths in APN.

This approach advantageously reduces the bandwidth consumption on a backup path by a factor of 20 or more when a standby WAN link is inactive. Even when a standby WAN link is active, i.e. when a backup path is active, this approach keeps the bandwidth consumption at a minimum by only turning one backup path active and keeping other backup paths in standby.

Figure 5:
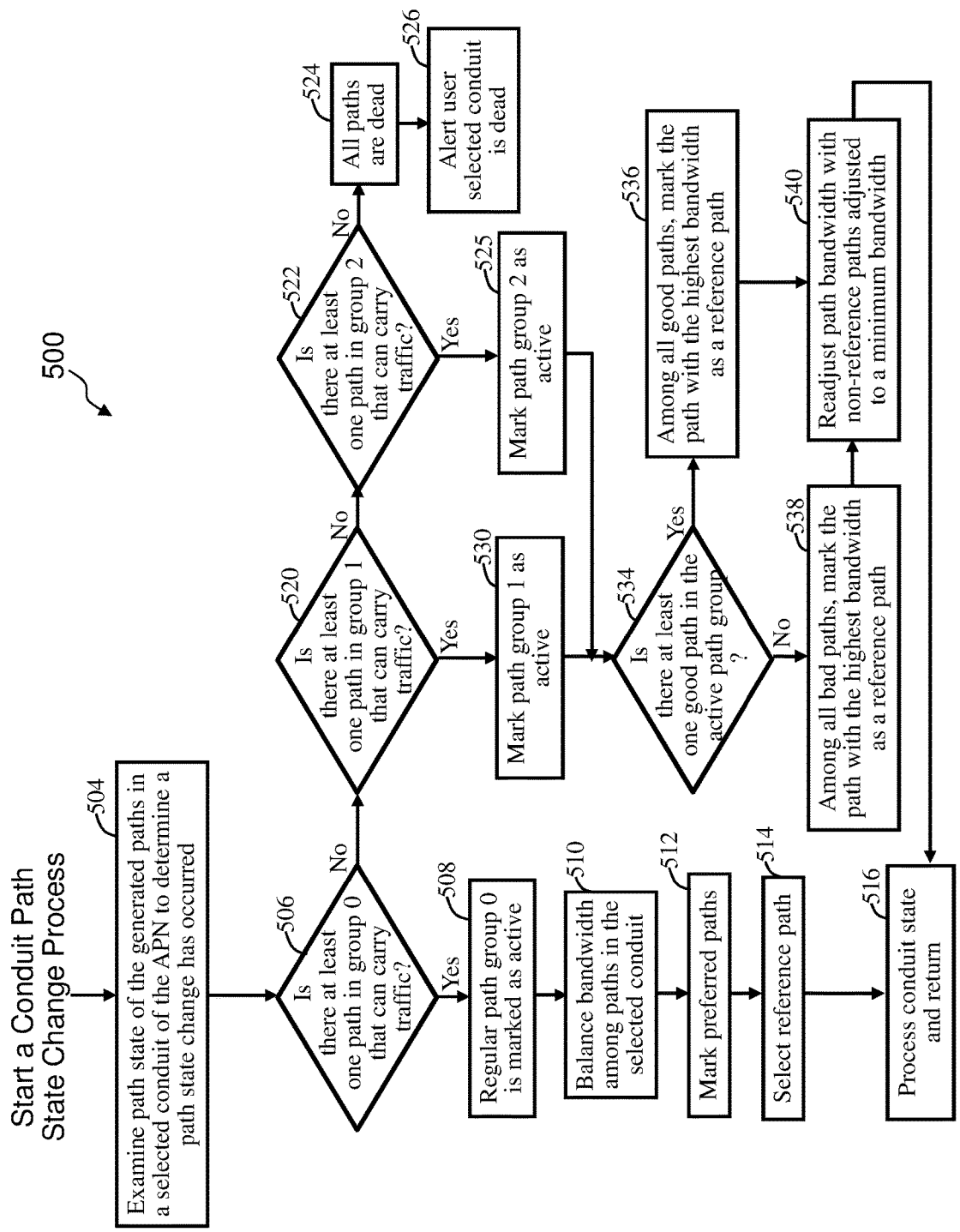
FIG. 5 illustrates a conduit path state change process in accordance with an embodiment of the present invention.

A path state change may trigger switching of activity between path groups. FIG. 5 illustrates a conduit path state change process 500 in accordance with an embodiment of the present invention. At step 504, path states of the generated paths in a selected conduit of the APN are monitored for bandwidth and packet loss, latency, and other characteristics useful in determining a path quality state at a specified monitoring bandwidth associated with each of the generated paths to determine each path's current operating state. At step 504, the current operating state of each path is examined in comparison with prior path operating state to determine that a path state change has occurred. At step 506, a determination is made whether there is at least one path in group 0 that can carry traffic. If there is at least one path in group 0 that can carry traffic, the process 500 proceeds to step 508. At step 508, the regular path group 0 is marked as active. At step 510, bandwidth is balanced among paths in the selected conduit. A path's bandwidth is a share of the bandwidth the WAN link's conduit is allowed to use. The share is configured in the APN configuration file. The conduit bandwidth is the sum of the bandwidths across the WAN links it uses. At step 512, among the paths in the selected conduit, paths that are in good state and have bandwidth exceeding a certain minimum value are marked preferred. Preferred paths are used by the forwarding plane to transmit user traffic. A path with less than the minimum required bandwidth is not considered in a GOOD state. Paths that are in a GOOD state and not marked preferred are used by user traffic, but they are not used for most control messages. At step 514, the path that has the shortest latency is selected as the reference path for specific control traffic, such as time synchronization control messages. Afterwards, at step 516, conduit state is processed and the process 500 returns to a calling program. The conduit state is a reflection of the state of paths making up the conduit. For example, a BAD conduit means that all paths in the conduit are in a BAD or worse state. A GOOD conduit means that at least one path is in a GOOD state. Software processes determine the current conduit state based on the states of the paths that are active. This determination can lead to events being issued that reflect state changes if the conduit state changes. The amount of aggregate bandwidth that is available to the conduit is calculated across all active WAN links. After the aggregate bandwidth is calculated, associated schedulers are updated to reflect that bandwidth value. This calculation could also trigger transmission quality report (TQR) messages to the far end of the conduit to reflect the current path and conduit states.

In a further embodiment, at step 506, a determination is made whether the number of network paths in group 0 that can carry traffic (#netpathsActiveInGroup0) has changed from the original configuration to less than or equal to a user configured minimum number before proceeding to step 520. For example, a user configured minimum number can be set to zero indicating that with #netpathsActiveInGroup0=0, there would be no remaining network paths in group 0 that are active, then the process 500 would proceed to step 520. If the number of active paths is greater than zero, then there is at least one path in group 0 that can carry traffic and the process 500 would proceed to step 508. In another example, if the user configured minimum number is set to one, indicating that with #netpathsActiveInGroup0≤1 active path in group 0, then there would be either no path in group 0 that is active or only one path in group 0 that is active and the process 500 would proceed to step 520. If the number of active paths is equal to two or greater, then the process 500 would proceed to step 508. In this further embodiment, rather than providing a strict limit of at least one in step 506, a user specified minimum number may be used for determining when a backup path is activated which might be important in conduits having high data traffic. It is noted that the user specified minimum number is not limited to the numbers 0 or 1 as described herein.

Returning to step 506, if there are no paths in group 0 that can carry traffic or in the further embodiment the #netpathsActiveInGroup0≤(user configured minimum number), the process 500 proceeds to step 520. At step 520, a determination is made whether there is at least one path in group 1 that can carry traffic. If there is at least one path in group 1 that can carry traffic, the process 500 proceeds to step 530. At step 530, having determined that at least one path in group 1 is active, then the path group 1 is marked as active. If there are no paths in group 1 that can carry traffic, the process 500 proceeds to step 522. At step 522, a determination is made whether there is at least one path in group 2 that can carry traffic. If there are no paths in group 2 that can carry traffic, the process 500 proceeds to step 524. At step 524, all paths in the selected conduit are marked as dead. At step 526, the selected conduit is marked as dead and the user is alerted that the selected conduit is down.

Returning to step 522, if there is at least one path in group 2 that can carry traffic, the process 500 proceeds to step 525. At step 525, having determined that at least one path in group 2 is active, then the path group 2 is marked as active. At step 534, a determination is made whether there is at least one good path in the active path group 1 or 2. If there is at least one good path in the active path group 1 or 2, the process 500 proceeds to step 536. At step 536, among all of the good paths in the active path group 1 or 2, the path with the highest bandwidth is marked as a reference path which is used for specific control traffic, such as time synchronization control messages. The process 500 then proceeds to step 540. Returning to step 534, if there is not at least one good path in the active path group 1 or 2, the process 500 proceeds to step 538. At step 538, among the remaining bad paths in the selected conduit, the path with the highest bandwidth is marked as a reference path which is used for specific control traffic, such as time synchronization control messages. The process 500 then proceeds to step 540. At step 540, path bandwidth for remaining non-reference paths is adjusted to have minimum bandwidth. In this state with only BAD paths available, only user traffic is placed on the reference path. Setting the non-reference BAD paths to the minimum reservation means the process 500 is not reserving bandwidth that will not be used. The reference paths determined in steps 514, 536, and 538 are to be used for specific control traffic, such as time synchronization control messages, and for user traffic. After step 540, the process 500 proceeds to step 516. At step 516, conduit state is processed and the process 500 returns to the calling program. All preferred paths in group 0, as determined at step 512, are used to carry user traffic. Depending on conduit path state changes, only 1 active path in group 1 or in group 2 is used to carry user traffic.

When activity is switched from group 0 to group 1 or 2, the backup path that is selected as the reference path becomes active and is specified with the same heartbeat interval as a regular path and all control traffic is allowed on this active backup path. When the activity is switched from group 1 or 2 to group 0, all backup paths are inactive and have the reduced backup heartbeat interval. No other control traffic is allowed on inactive backup paths. Any activity switch between path groups triggers re-calculation of conduit maximum transmission unit (MTU). When calculating the conduit's MTU, only the MTU of active paths are considered.

While the present invention has been disclosed in the context of various aspects of presently preferred embodiments, it will be recognized that the invention may be suitably applied to other environments consistent with the claims which follow.

We claim:

1. A method to activate a standby WAN link selected from a plurality of standby WAN links based on quality metrics of each of the standby WAN links, the method comprising:

configuring an adaptive private network (APN) with a plurality of network paths including a plurality of regular WAN links, a plurality of backup WAN links, and a plurality of standby backup WAN links connecting a first user and a second user, the regular WAN links carrying user data traffic, the backup WAN links carrying control traffic, and the standby backup WAN links not carrying the user data traffic and having reduced control traffic when in standby mode, wherein each of the network paths is a unidirectional logical connection including a plurality of WAN links, wherein the control traffic includes heartbeat messages;

assigning network paths each utilizing two regular WAN links to a first group as active network paths and network paths each utilizing one standby WAN link and one regular WAN link to a second group as backup network paths;

assigning network paths each utilizing two standby backup WAN links to a third group as standby backup network paths;

transmitting the heartbeat messages on said active network paths with a first time between transmission of the heartbeat messages and transmitting the heartbeat messages on said standby backup network paths with a second time greater than said first time between transmissions of the heartbeat messages, wherein transmitting the heartbeat messages with the first transmission time between transmission of the heartbeat messages uses a first control bandwidth on said active network paths and transmitting the heartbeat messages with the second transmission time between transmissions of the heartbeat messages uses a second control bandwidth less than the first control bandwidth on said standby backup network paths;

determining, in a first monitoring operation, bandwidth and packet loss and latency metrics for the plurality of network paths in the second group;

determining, in a second monitoring operation, a number of network paths in the first group that can carry user traffic has been reduced to less than or equal to a user configured minimum number and there are at least two network paths in the second group that can carry user traffic;

determining there is at least one or more good quality state network paths in the second group that can carry user traffic;

marking as a reference path a path in the second group with the highest bandwidth among the one or more good quality state network paths, wherein one standby WAN link of the plurality of standby WAN links and associated with the reference path transitions from standby mode to an active mode thereby making the reference path active;

transmitting heartbeat messages on said reference path with said first time between said heartbeat messages;

adjusting path bandwidth of non-reference paths among the good quality state network paths in the second group to a minimum bandwidth by only reserving bandwidth that will be used on the non-reference path; and responsive to a determination that the number of paths in said first group has been reduced to less than or equal to the user configured minimum number and that the number of paths in said second group has been reduced to less than or equal to the user configured minimum number, making the paths in the third group active.

2. The method of claim 1, wherein the number of network paths in the first group that can carry user traffic has been reduced to less than one, indicating there are no active network paths in the first group.

3. The method of claim 1 further comprising:

determining, in a second monitoring operation, updated bandwidth and packet loss and latency metrics for the plurality of network paths including the plurality of standby backup WAN links according to control traffic;

determining there are no network paths in the first group that can carry user traffic and there are at least one or more network paths in the second group that can carry user traffic;

determining there are only bad quality state network paths in the second group that can carry user traffic; and marking as active a network path with the highest bandwidth among the bad quality state network paths, wherein one standby backup WAN link is selected from a plurality of standby WAN links.

4. The method of claim 1, wherein in an adaptive private network (APN), a preferred path having the shortest latency is selected at a reference path for time synchronization control messages to synchronize network time in the nodes of the APN.

5. The method of claim 1, wherein reserved network path bandwidth for active network paths is readjusted to a minimum bandwidth.

6. A non-transitory computer readable medium having stored thereon executable instructions that when executed by a processor of a computer control the computer to perform steps comprising:

configuring an adaptive private network (APN) with a plurality of network paths including a plurality of regular WAN links, a plurality of backup WAN links, and a plurality of standby backup WAN links connecting a first user and a second user, the regular WAN links carrying user data traffic, the backup WAN links carrying control traffic, and the standby backup WAN links not carrying the user data traffic and having reduced control traffic when in standby mode, wherein each of the network paths is a unidirectional logical connection including a plurality of WAN links, wherein the control traffic includes heartbeat messages;

assigning network paths each utilizing two regular WAN links to a first group as active network paths and network paths each utilizing one standby WAN link and one regular WAN link to a second group as backup network paths;

assigning network paths each utilizing two standby backup WAN links to a third group as standby backup network paths;

transmitting the heartbeat messages on said active network paths with a first time between transmission of the heartbeat messages and transmitting the heartbeat messages on said standby backup network paths with a second time greater than said first time between transmissions of the heartbeat messages, wherein transmitting the heartbeat messages with the first transmission time between transmission of the heartbeat messages uses a first control bandwidth on said active network paths and transmitting the heartbeat messages with the second transmission time between transmissions of the heartbeat messages uses a second control bandwidth less than the first control bandwidth on said standby backup network paths;

determining, in a first monitoring operation, bandwidth and packet loss and latency metrics for the plurality of network in the second group;

determining, in a second monitoring operation, a number of network paths in the first group that can carry user traffic has been reduced to less than or equal to a user configured minimum number and there are at least two network paths in the second group that can carry user traffic;

determining there is at least one or more good quality state network paths in the second group that can carry user traffic;

marking as a reference path a path in the second group with the highest bandwidth among the one or more good quality state network paths, wherein one standby WAN link of the plurality of standby WAN links and associated with the reference path transitions from standby mode to an active mode thereby making the reference path active;

transmitting heartbeat messages on said reference path with said first time between said heartbeat messages;

adjusting path bandwidth of non-reference paths among the good quality state network paths in the second group to a minimum bandwidth by only reserving bandwidth that will be used on the non-reference path; and responsive to a determination that the number of paths in said first group has been reduced to less than or equal to the user configured minimum number and that the number of paths in said second group has been reduced to less than or equal to the user configured minimum number, making the paths in the third group active.

* * * * *